(12) United States Patent
Yasui et al.

(10) Patent No.: US 6,382,034 B1
(45) Date of Patent: May 7, 2002

(54) TORQUE SENSING UNIT MANUFACTURING METHOD, SENSOR MODULE, AND TORQUE SENSING UNIT

(75) Inventors: Katsuaki Yasui; Yutaka Ohashi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/626,864

(22) Filed: Jul. 27, 2000

(30) Foreign Application Priority Data

Jan. 26, 2000 (JP) .......................... 2000-016846

(51) Int. Cl.[7] .............................. G01L 3/00; B62D 5/04
(52) U.S. Cl. ............................. 73/862.08; 73/862.333; 180/444
(58) Field of Search .................. 73/862.08, 862.321, 73/862.331, 862.33, 862.355; 180/444

(56) References Cited

U.S. PATENT DOCUMENTS

| 4,314,490 A | 2/1982 | Stone | 81/73 |
| 4,881,414 A | * 11/1989 | Setaka et al. | 73/862.23 |
| 5,515,736 A | * 5/1996 | Kawagoe et al. | 73/862.333 |
| 6,138,081 A | 10/2000 | Olejack et al. | 702/704 |

FOREIGN PATENT DOCUMENTS

JP 6-174569 6/1994 .............. G01L/3/10

* cited by examiner

*Primary Examiner*—Max Noori
*Assistant Examiner*—Andre Allen
(74) *Attorney, Agent, or Firm*—Sughrue Mion, PLLC

(57) ABSTRACT

A torque sensing unit, sensor unit, and method for manufacturing the torque sensing unit. The torque sensing unit includes a first shaft and a second shaft rotatably arranged in a coaxial fashion, and a torsion bar for allowing a rotational displacement in response to a torque between the first shaft and the second shaft. Magnetic elements are used in conjunction with the shafts for sensing a reluctance which is changed in compliance with rotational phase differences between the magnetic elements. A sensor module is prepared in which the magnetic elements are temporarily fixed to have a predetermined neutral rotational phase difference. This temporary fixture is released after the first shaft 1, the second shaft 2, the torsion bar 3, and the sensor module have been assembled.

8 Claims, 4 Drawing Sheets

TORQUE SENSING UNIT MANUFACTURING METHOD, SENSOR MODULE, AND TORQUE SENSING UNIT

BACKGROUND OF THE INVENTION

The present invention relates to a torque sensing unit employed in a power steering mechanism of a car, etc. and, more particularly, a torque sensing unit for sensing a torque in a non-contact manner when an external force is applied to a rotation shaft and a method of manufacturing the same.

In the prior art, the power steering mechanism in which, when the driver steers the car by turning the steering wheel, the rotating force is applied from the motor to the steering mechanism in response to the torque applied to the steering wheel so as to assist the steering force mechanism has been employed.

In the power steering mechanism, in order to decide a power assisting amount, the torque applied to the steering wheel must be sensed. As the sensing unit, there is the torque sensing unit disclosed in the Unexamined Japanese Patent Application Publication No. Hei 6-174569, for example. The structure of this sensing unit will be explained with reference to FIG. 4.

In FIG. 4, the steering wheel (not shown) is attached to a first shaft 1, and the pinion gear (not shown) of the steering mechanism is attached to a second shaft 2. Then, a torsion bar 3 is arranged on center shafts of the first shaft 1 and the second shaft 2 to connect elastically two shafts in the twisting direction. The first shaft 1 is supported rotatably to a cylindrical case 4, which is fitted to the body of the car, etc., via a bearing 14a. A first sleeve 14a formed of non-magnetic material is secured to the first shaft 1. A first cylindrical magnetic element 11 and a second cylindrical magnetic element 12, both are formed of soft magnetic material, and are secured on an outer periphery of the first sleeve 14a at a predetermined interval.

The right end edge of the first magnetic element 11 is formed as a flat plane perpendicular to the shaft center of the first shaft 1, and rectangular teeth portions 11a are formed on the left end edge at an equal pitch along the peripheral direction. The right end edge of the second magnetic element 12, which opposes to the first magnetic element 11, is formed as a flat plane perpendicular to the shaft center of the first shaft 1, and rectangular teeth portions 12a are formed on the left end edge at an equal pitch along the peripheral direction. A teeth width dimension of the teeth portion 12a is set substantially equal to a width dimension of a notched portion of the teeth portion 12a.

A second sleeve 14b formed of non-magnetic material is secured to the second shaft 2, and a third cylindrical magnetic element 13 formed of non-magnetic material is secured to an outer periphery of the second sleeve 14b. A plurality of teeth portions 13a that have the same width, the same shape, and the same pitch as those of the teeth portion formed on the second magnetic element 12 are formed on the right end edge of the third magnetic element 13.

Yokes 22a, 22b, which are formed to have a cup-shaped sectional shape having inner flanges and formed of soft magnetic material are secured onto the inside of the case 4. The yoke 22a has a length to extend the first magnetic element 11 and the second magnetic element 12 such that the center portion in the axial direction can be arranged at a position opposing to the first magnetic element 11 and the second magnetic element 12. Also, the yoke 22b has a length to extend the second magnetic element 12 and the third magnetic element 13 such that the center portion in the axial direction can be arranged at a position opposing to the second magnetic element 12 and the third magnetic element 13.

A first coil 21a for temperature compensation and a second coil 21b for torque sense are wound on the yokes 22a, 22b along the peripheral direction respectively. Then, when the first coil 21a and the second coil 21b are connected to an oscillator (not shown), the yoke 22a together with the first magnetic element 11 and the second magnetic element 12 constitute a magnetic circuit, while the yoke 22b together with the second magnetic element 12 and the third magnetic element 13 constitute a magnetic circuit.

Next, an operation of the above torque sensing unit will be explained hereunder. When the torque is applied to the second shaft 2 from the steering wheel, twisted deformation is caused in the torsion bar 3, so that a relative angular displacement is generated between the first shaft 1 and the second shaft 2. Then, relative phase difference is generated in the peripheral direction between the second magnetic element 12 and the third magnetic element 13, which are secured to respective shafts via the sleeves 14a, 14b respectively. Therefore, opposing areas between the teeth portions 12a and the teeth portions 13a provided to respective magnetic elements 12, 13 to serve as magnetic paths are changed. Since the second coil 21b constitutes a part of the magnetic circuit which passes the yoke 22b, the second magnetic element 12, and the third magnetic element 13, the magnetic reluctance of this magnetic circuit is changed to then change the inductance when the opposing areas between the teeth portions 12a and the teeth portions 13a acting as the magnetic path is changed. Then, if the AC driving current of the frequency several kHz is supplied to the coil to sense the change in the inductance by the sensing circuit (not shown), the torque applied to the torsion bar 3 can be sensed.

Because the inductance of the second coil 21b is changed by not only the torque but also the temperature, the temperature compensation is needed. Since both the first magnetic element 11 and the second magnetic element 12 are secured to the first shaft 1 via the sleeve 14a, the relative angle between them is not changed by the application of the torque and thus the opposing areas between the teeth portions 11a and the teeth portions 12a are also not changed. Accordingly, the inductance of the first coil 21a which is wound at the middle position between the first magnetic element 11 and the second magnetic element 12 is not changed by the torque. However, since the first coil 21a can change its inductance in response to the change in temperature in the same fashion as the second coil 21b, the output which is not affected by the temperature and is in proportion to only the torque can be derived by sensing difference of the inductance between the first coil 21a and the second coil 21b.

Next, the method of manufacturing the above torque sensing unit will be explained hereunder. The step of coupling the first shaft 1 and the second shaft 2 with the torsion bar 3 produces easily the angular error. For this reason, in order to fix precisely the rotational phase difference between the magnetic elements at the neutral position, first the first sleeve 14 having the magnetic elements 11, 12 is secured to the first shaft 1. Then, the second sleeve 14b having the third magnetic element 13 is not secured to the second shaft 2 but merely fitted to the second shaft 2. After the first shaft 1 and the second shaft 2 are coupled together by the torsion bar 3, the second sleeve 14b is adjusted such that the rotational phase difference between the first sleeve 14a and the second sleeve 14b is set to a predetermined angle, and then secured to the second shaft 2.

Since the torque sensing unit in the prior art is fabricated as mentioned above, there are such problems that the manufacturing steps become complicated and a higher cost is brought about.

Also, in the variable reluctance type torque sensing unit in the prior art, since the first shaft and the second shaft are made of steel in normal case, the magnetic flux generated in the coils flow into the magnetic elements as well as the above shafts. However, there is such a problem that, since the magnetic characteristic of the shafts has large variation and also the temperature characteristic of the shafts is not good, the precision of the torque sensing unit is degraded if a structure in which a great deal of leakage magnetic flux flows into the shafts is employed.

SUMMARY OF THE INVENTION

The present invention has been made to overcome the above-mentioned problem, and it is an object of the present invention to provide a torque sensing unit having high sensing precision, a torque sensing sensor module, and a simple method of manufacturing the same.

The invention set forth in aspect 1 has such an aspect that a method of manufacturing a torque sensing unit which comprises a first shaft and a second shaft rotatably arranged in a coaxial manner to oppose to each other, an elastic member for generating a twisted displacement in response to a torque between the first shaft and the second shaft, a magnetic element rotated in a same phase as the first shaft and magnetic elements rotated in a same phase as the second shaft, and coils for sensing reluctances which are changed in compliance with rotational phase difference between these magnetic elements, whereby the torque acting between the first shaft and the second shaft is sensed, the method comprising the steps of preparing a sensor module in which the magnetic element rotated in the same phase as the first shaft and the magnetic elements rotated in the same phase as the second shaft are temporarily fixed to have a predetermined neutral rotational phase difference previously; and releasing temporary fixing after the first shaft, the second shaft, the elastic member and the sensor module have been assembled.

The invention set forth in aspect 2 has such as aspect that a sensor module constituting a part of a torque sensing unit which comprises a first shaft and a second shaft rotatably arranged in a coaxial manner to oppose to each other, an elastic member for generating a twisted displacement in response to a torque between the first shaft and the second shaft, a magnetic element rotated in a same phase as the first shaft and magnetic elements rotated in a same phase as the second shaft, and coils for sensing reluctances which are changed in compliance with rotational phase difference between these magnetic elements, whereby the torque acting between the first shaft and the second shaft is sensed, wherein the magnetic element rotated in the same phase as the first shaft and the magnetic elements rotated in the same phase as the second shaft are temporarily fixed to have a predetermined rotational phase difference.

The invention set forth in aspect 3 has such an aspect that the sensor module further comprises a plurality of pairs of magnetic elements whose reluctances are changed in compliance with the rotational phase difference between the first shaft and the second shaft, and wherein these are temporarily fixed.

The invention set forth in aspect 4 has such an aspect that the sensor module further comprises a base formed of conductive material to surround the first shaft, the second shaft, and both of them, and wherein the magnetic elements are arranged on an outer side than the base.

The invention set forth in aspect 5 has such an aspect that the sensor module further comprises a base formed of conductive material to surround the first shaft, the second shaft, and both of them; and a first supporting member and a second supporting member which are arranged on an outer side than the base; wherein the first supporting member is fixed to the base and the second supporting member is fixed to the second shaft, and magnetic elements are arranged on surfaces of the first supporting member and the second supporting member.

The invention set forth in aspect 6 has such an aspect that the sensor module further comprises a base formed of conductive material to surround the first shaft, the second shaft, and both of them; and magnetic elements which are arranged on an outer side than the base; wherein a caulking portion whose thickness is about half of other portions or less is provided to a portion of the base, which is not hidden under the magnetic elements.

The invention set forth in aspect 7 has such an aspect that the magnetic elements are formed of soft magnetic amorphous metal.

The invention set forth in aspect 8 has such an aspect that the sensor module further comprises temporary fixing member which has a cylindrical band portion, ribs for limiting axial movement of the first magnetic elements and the second magnetic element or supporting members to which these magnetic elements are secured, and a fastening mechanism for fastening the band.

The invention set forth in aspect 9 has such as aspect that a torque sensing unit which comprises a first shaft and a second shaft rotatably arranged in a coaxial manner to oppose to each other, an elastic member for generating a twisted displacement in response to a torque between the first shaft and the second shaft, a magnetic element rotated in a same phase as the first shaft and magnetic elements rotated in a same phase as the second shaft, and coils for sensing reluctances which are changed in compliance with rotational phase difference between these magnetic elements, whereby the torque acting between the first shaft and the second shaft is sensed, the unit comprising a base formed of conductive material to surround the first shaft, the second shaft, and both of them, and wherein the magnetic elements are arranged on an outer side than the base.

DETAILED DESCRIPTION OF THE PREFERRED EMBODIMENTS

Embodiment 1

Figure 1:
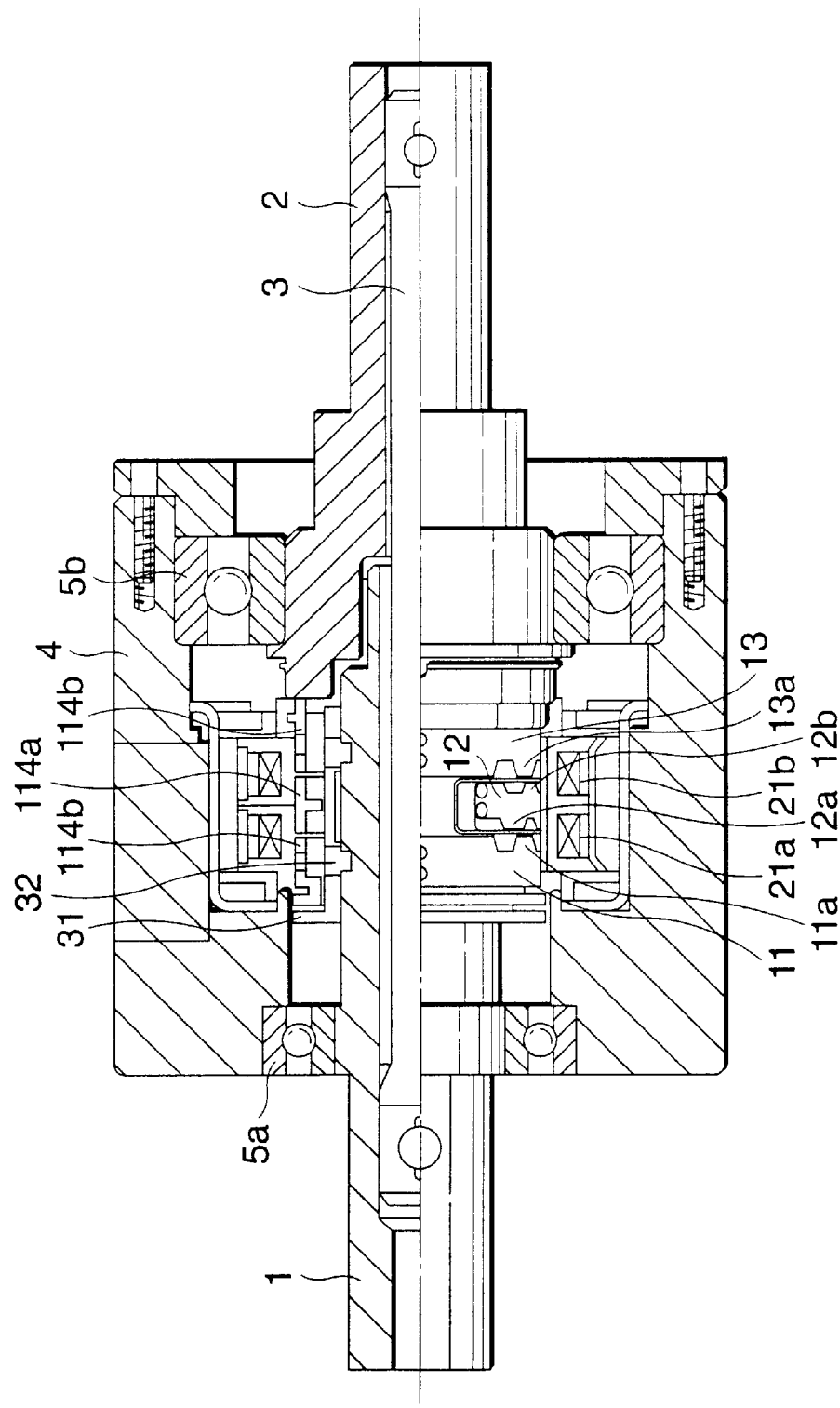
FIG. 1 is a partially-sectioned front view showing a torque sensing unit according to an embodiment 1 of the present invention.

FIG. 1 is a front sectional view showing a torque sensing unit according to an embodiment 1 of the present invention.

Figure 4:
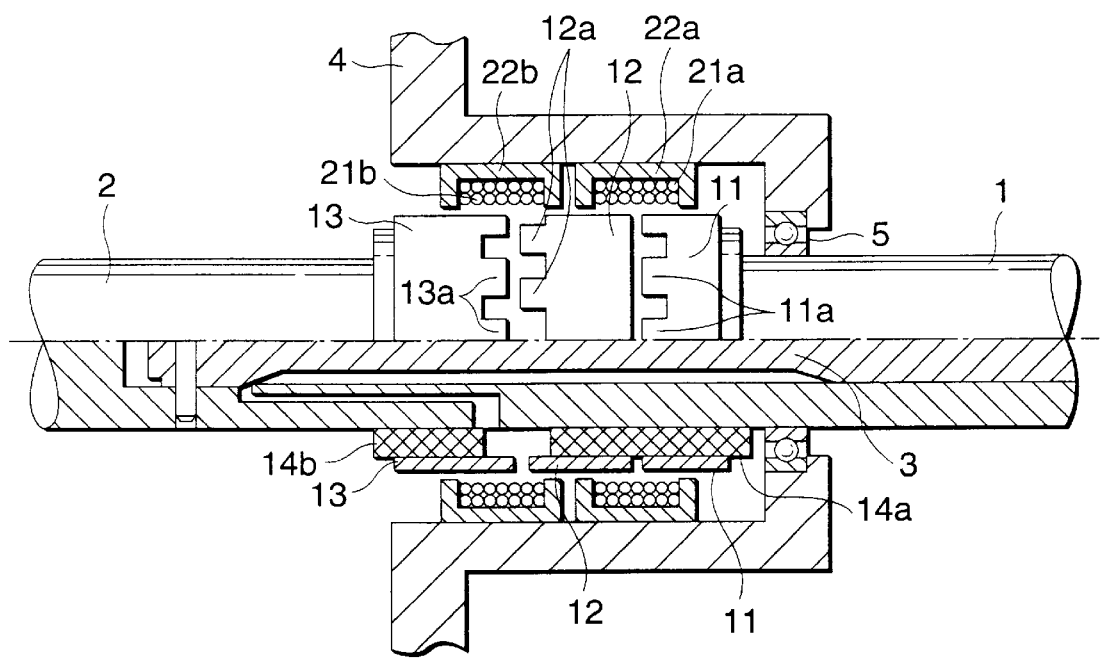
FIG. 4 is a partially-sectioned front view showing a torque sensing unit in the prior art.

Same symbols are affixed to same or equivalent member and parts as in FIG. 4 as the example in the prior art.

In FIG. 1, the steering wheel (not shown) is attached to a first shaft 1, and the pinion gear (not shown) of the steering mechanism is attached to a second shaft 2. Then, a torsion bar 3 is arranged on center shafts of the first shaft 1 and the second shaft 2 to connect elastically two shafts in the twisting direction. The first shaft 1 and the second shaft 2 are supported rotatably to a cylindrical case 4, which is fitted to the body of the car, etc., via bearings 5a, 5b.

A cylindrical aluminum base 31 having a predetermined length in the axial direction is secured to the first shaft 1 such that it can be fixed by caulking a caulking portion 32 onto the first shaft 1.

A supporting member 114b is a cylindrical plastic part which is arranged along the cylindrical aluminum base 31, and is fixed to the second shaft 2 by caulking an aluminum portion on the right end. Also, a pair of large windows used to arrange a supporting member 114a are provided on the center portion of the supporting member 114b in the axial direction. The supporting member 114a is a pair of plastic parts, shown vertically in FIG. 1, whose head portion is protruded from the window of the supporting member 114b and whose lower portion is secured to an outer periphery of the base 31.

First and third magnetic elements 11, 13 are formed of soft magnetic amorphous metal foil, etc., which is secured to be round on a cylindrical outer surface of the supporting member 114b. Also, a second magnetic element 12 is formed of a pair of soft magnetic amorphous metal foils, etc., which are secured respectively to be round on cylindrical outer surfaces of a pair of supporting members 114a.

Rectangular teeth portions 11a are formed on the right end edge of the first magnetic element 11 at an equal pitch along the peripheral direction. Rectangular teeth portions 12a are formed on the left end edge of the second magnetic element 12, which opposes to the right end edge of the first magnetic element 11, at an equal pitch along the peripheral direction, and also rectangular teeth portions 12b are formed on the right end edge of the second magnetic element 12, which opposes to the left end edge of the third magnetic element 13, at an equal pitch along the peripheral direction. Also, rectangular teeth portions 13a are formed at an equal pitch on the left end edge of the third magnetic element 13.

A first coil 21a is a coil which is wound to circulate an outer periphery located at an intermediate position between the first magnetic element 11 and the second magnetic element 12. Also, a second coil 21b is a coil which is wound to circulate an outer periphery located at an intermediate position between the second magnetic element 12 and the third magnetic element 13.

Next, an operation of the torque sensing unit according to the above embodiment will be explained hereunder. If the torque is applied to the second shaft 2 from the steering wheel (not shown), twisted deformation is caused in the torsion bar 3, so that a relative angular displacement is generated between the first shaft 1 and the second shaft 2. Then, rotational phase difference is generated in the peripheral direction between the second magnetic element 12 which is secured to the first shaft 1 via the supporting member 114a, and the first magnetic element 11 and the third magnetic element 13, which are secured to the second shaft 2 via the supporting member 114b, so that opposing areas between the teeth portions provided to respective magnetic element to serve as magnetic paths are changed. For example, in FIG. 1, if the second magnetic element 12 is displaced upward by twisting the first shaft 1 in the situation that the second shaft 2 and the first and third magnetic elements 11, 13 secured to the second shaft 2 are fixed, the opposing area between the teeth portions 11a and the teeth portions 12a is reduced while the opposing area between the teeth portions 12b and the teeth portions 13a is increased. Thus, the inductance of the first coil 21a is reduced while the inductance of the second coil 21b is increased. Then, the torque can be sensed by applying an AC current from the sensing circuit (not shown) and then sensing change in the inductance.

According to the torque sensing unit of the embodiment, the alternating magnetic flux, which is generated in respective coils by the AC current applied from the sensing circuit (not shown), can flow into respective magnetic elements. Nevertheless, such alternating magnetic flux seldom reaches the first shaft 1 and the second shaft 2 which are positioned on the inner side than the base 31 since it is canceled by the eddy current generated in the base 31 formed of conductive material. As a consequence, such an advantage can be achieved that the inductance of the coil does not depend on the magnetic characteristic of the above shaft and thus change in the inductance due to only the rotational phase difference between the magnetic elements can be sensed.

Also, if the soft magnetic amorphous metal foil is employed as the magnetic elements, such metal foil is very excellent in the magnetic characteristic and has a small thickness of less than several tens $\mu$m. As a result, such metal foil is most preferable for formation of the compact and high precision sensor module.

Figure 2:
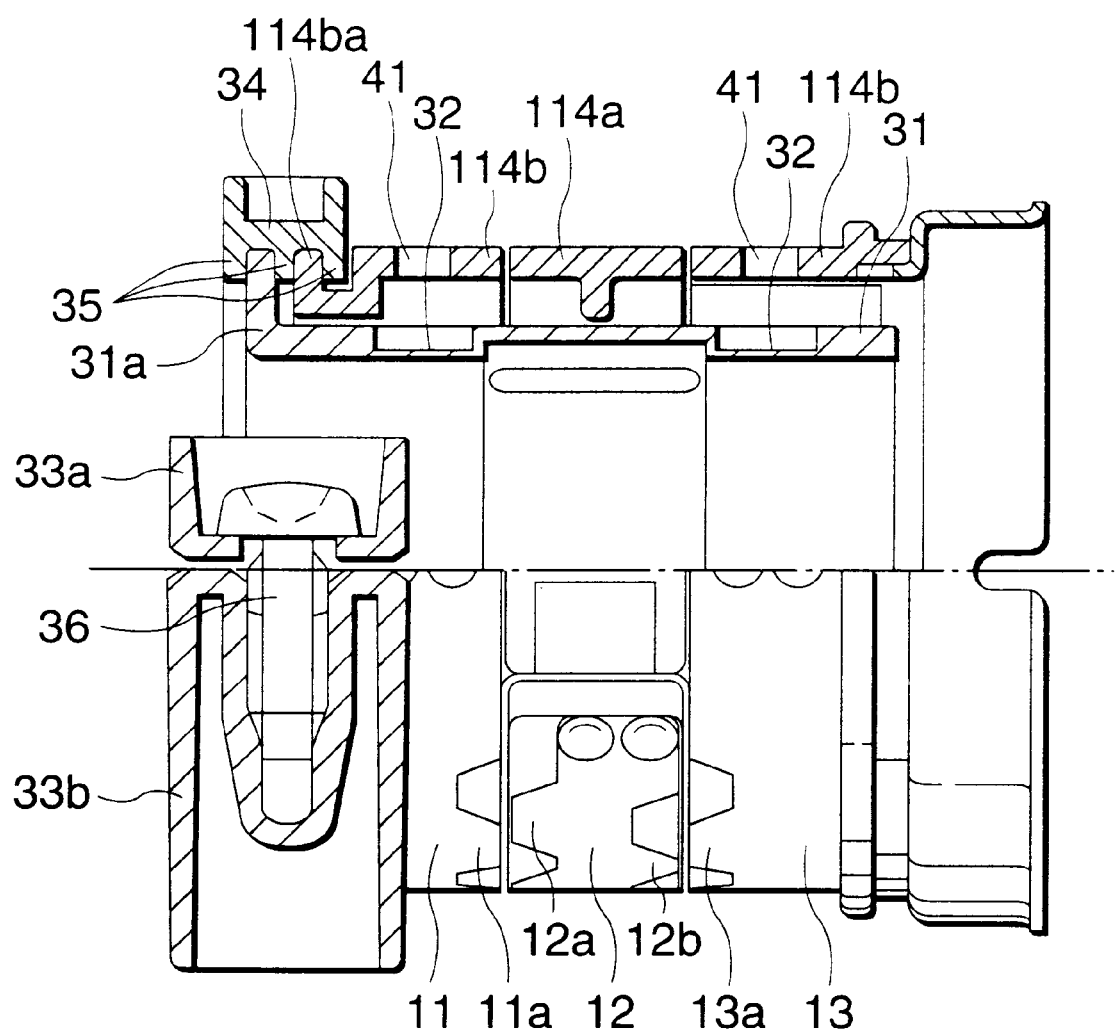
FIG. 2 is a partially-sectioned front view showing a sensor module of the torque sensing unit according to the embodiment 1 of the present invention.
Figure 3:
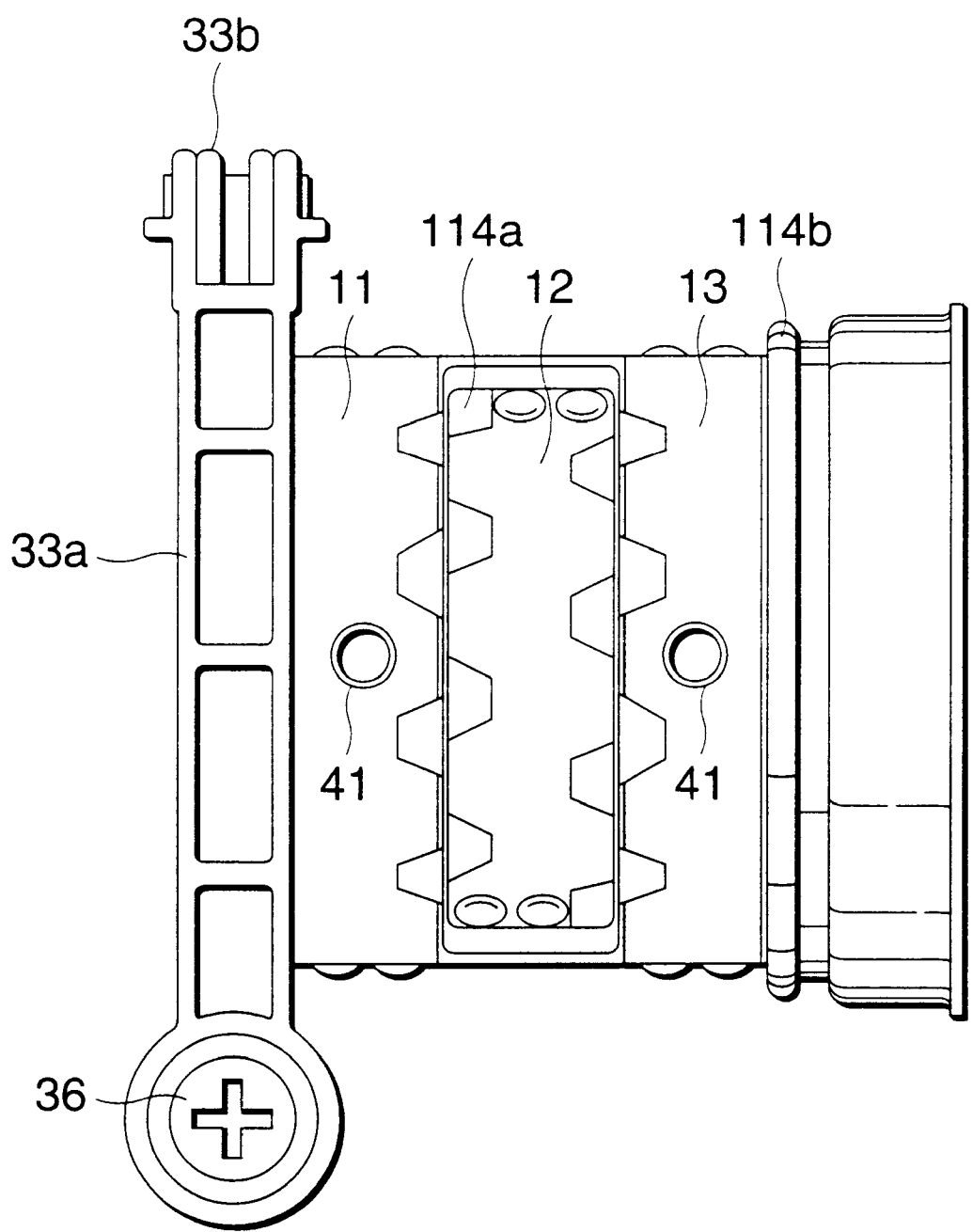
FIG. 3 is a top view showing the sensor module of the torque sensing unit according to the embodiment 1 of the present invention.

Next, a method of manufacturing the torque sensing unit will be explained hereunder. FIG. 2 is a partially-sectioned front view showing a sensor module of the torque sensing unit according to the embodiment of the present invention. FIG. 3 is a top view showing the sensor module of the torque sensing unit according to the embodiment of the present invention.

As shown in the sectional view given in the upper half of FIG. 2, a donut-shaped rib 31a is provided to the left end of the base 31, and also a donut-shaped rib 114ba is provided to the left end of the supporting member 114b. These ribs are put between a pair of plastic temporary fixing members 33a, 33b to be temporarily fixed. In other words, each of the temporary fixing members 33a, 33b has a half-cylindrical band portion 34 and three ribs 35. Relative displacements of the base 31 and the supporting member 114b along the radial direction are limited by the band portion 34, and also relative displacements of the base 31 and the supporting member 114b along the axial direction are limited by the three ribs 35.

In FIG. 3, top ends of a pair of temporary fixing members 33a, 33b constitute a hinge, and bottom ends thereof constitute seats of self-tapping screws. The temporary fixing members 33a, 33b are secured mutually by screwing the self-tapping screws 36 and thus the base 31 and the supporting member 114b are temporarily fixed, whereby the sensor module of the torque sensing unit can be constructed. At that time, the sensor module is constructed precisely such that rotational phase differences between the first to third magnetic elements 11, 12, 13 can be positioned at predetermined neutral positions.

Then, the sensor module is fitted into the first shaft 1 such that a hole provided in the first shaft 1 is superposed with the caulking portion 32. Then, a thin portion of the caulking portion 32 is pushed into the hole provided in the first shaft 1 by pushing the rod-like tool against the caulking portion 32 through a hole portion 41 provided in the supporting member 114b, and then caulked. At this time, if the thickness of the caulking portion 32 is too thick, the overall base 31 is cramped and thus deformed and therefore such thickness of the caulking portion 32 is set to about the half of other portion or less.

Then, the first shaft 1 and the second shaft 2 are coupled together by the torsion bar 3. In the prior art, the subject is the wrong precision of the relative angle in this step. However, in the manufacturing method of the embodiment, since the sensor module is temporarily fixed as it is in this step, it can hold its predetermined neutral state. Under this condition, the right end of the supporting member 114b is caulked and fixed to the second shaft 2, and then the temporary fixing members 33a, 33b are removed. As a result, the shaft portion of the torque sensing unit can be fabricated while keeping the neutral position states of the first magnetic element 11 to the third magnetic element 13.

According to the present invention set forth in aspect 1 to aspect 8, the sensor module is prepared in which the magnetic elements rotated in the same phase as the first shaft and the magnetic element rotated in the same phase as the second shaft are temporarily fixed to have the predetermined neutral rotational phase difference previously, and then the temporary fixing is released after the first shaft, the second shaft, the elastic member and the sensor module have been assembled. Therefore, there can be achieved such advantages that there is no necessity to adjust the angle when the first shaft and the second shaft are coupled together by the elastic member and thus the torque sensing unit can be fabricated by the simple manufacturing steps.

According to the present invention set forth in aspect 4 to aspect 6 and aspect 9, the shafts are surrounded by the base formed of conductive material, and the magnetic elements are arranged on the outer side than the base. Therefore, there can be achieved such advantages that the magnetic flux generated by the coil does not flow into the shafts and thus the problem of the wrong precision due to instability of the magnetic characteristic of the shafts can be overcome.

What is claimed is:

1. A sensor module comprising a part of a torque sensing unit which comprises a first shaft and a second shaft rotatably arranged in a coaxial manner to oppose each other, an elastic member for allowing a rotational displacement in response to a torque between said first shaft and said second shaft, a first magnetic element of a plurality of magnetic elements rotated in a same phase as said first shaft and other magnetic elements of the plurality of magnetic elements rotated in a same phase as said second shaft, and coils for sensing reluctances which are changed in compliance with rotational phase differences between said first and said other magnetic elements, so as to sense the torque acting between said first shaft and said second shaft, wherein said first magnetic element rotated in the same phase as said first shaft and said other magnetic elements rotated in the same phase as said second shaft are temporarily fixed to have a predetermined rotational phase difference.

2. The sensor module according to claim 1, further comprising:
a plurality of pairs of the plurality of magnetic elements whose reluctances are changed in compliance with the predetermined rotational phase difference between said first shaft and said second shaft to be fixed temporarily.

3. The sensor module according to claim 1, further comprising:
a base formed of conductive material to surround said first shaft and said second shaft, wherein said plurality of magnetic elements are arranged radially outwardly of the base.

4. The sensor module according to claim 3, further comprising:
a first supporting member and a second supporting member which are arranged outwardly from the base; wherein said first supporting member is fixed to said base and said second supporting member is fixed to said second shaft, and said plurality of magnetic elements are arranged on surfaces of said first supporting member and said second supporting member.

5. The sensor module according to claim 3, wherein a caulking portion whose thickness is about half of other portions or less is provided to a portion of said base, which is not hidden under said plurality of magnetic elements.

6. The sensor module according to claim 1, wherein said plurality of magnetic elements are formed of soft magnetic amorphous metal.

7. The sensor module according to claim 1, further comprising:
a temporary fixing member which has a cylindrical band portion;
ribs for limiting axial movement of said plurality of magnetic elements or supporting members to which said magnetic elements are secured; and
a fastening mechanism for fastening the band portion.

8. A torque sensing unit which comprises a first shaft and a second shaft rotatably arranged in a coaxial manner to oppose each other, an elastic member for allowing a rotational displacement in response to a torque between said first shaft and said second shaft, a first of a plurality of magnetic elements rotated in a same phase as said first shaft and other magnetic elements of the plurality of magnetic elements rotated in a same phase as said second shaft, and coils for sensing reluctances which are changed in compliance with rotational phase differences between said first and said other magnetic elements, so as to sense the torque acting between said first shaft and said second shaft, said torque sensing unit comprising:
a base formed of conductive material to surround said first shaft and said second shaft, wherein said plurality of magnetic elements are arranged radially outwardly of the base, and wherein said first and said other magnetic elements are temporarily fixed to have a predetermined rotational phase difference.

* * * * *